United States Patent [19]

Awazu et al.

[11] Patent Number: 5,065,178

[45] Date of Patent: Nov. 12, 1991

[54] PHOTOSENSITIVE MATERIAL DETECTING APPARATUS

[75] Inventors: Yasunobu Awazu; Yoshihiro Masuda; Eiji Nishimura, all of Kyoto, Japan

[73] Assignee: Dainippon Screen Mfg. Co., Ltd., Japan

[21] Appl. No.: 603,937

[22] Filed: Oct. 25, 1990

[30] Foreign Application Priority Data

Nov. 27, 1989 [JP] Japan .............................. 1-137142[U]

[51] Int. Cl.[5] ........................ G03B 27/32; G03B 27/52

[52] U.S. Cl. ........................................ 355/27; 355/41; 355/50; 355/77

[58] Field of Search ........................ 355/27, 41, 50, 51, 355/103, 108, 77; 250/559, 571; 352/92, 124, 173

[56] References Cited

U.S. PATENT DOCUMENTS

| | | | |
|---|---|---|---|
| 3,741,645 | 6/1973 | Hollwedel, Jr. et al. | 355/41 |
| 3,768,905 | 10/1973 | Williams | 355/77 |
| 3,836,248 | 9/1974 | John, Jr. | 355/50 |
| 3,865,486 | 2/1975 | Miles et al. | 355/41 X |
| 3,874,791 | 4/1975 | Thieme et al. | 355/41 |
| 3,922,084 | 11/1975 | Burton et al. | 355/41 |
| 4,548,492 | 10/1985 | Kanaoka et al. | 355/50 |
| 4,914,474 | 4/1990 | Townsend | 355/50 X |
| 4,994,851 | 2/1991 | Iwai | 352/124 X |

FOREIGN PATENT DOCUMENTS

| | | |
|---|---|---|
| 58-2841 | 1/1983 | Japan . |
| 63-12986 | 1/1988 | Japan . |
| 63-157087 | 6/1988 | Japan . |

*Primary Examiner*—Richard A. Wintercorn
*Attorney, Agent, or Firm*—Ostrolenk, Faber, Gerb & Soffen

[57] ABSTRACT

A photosensitive material detecting apparatus having a single or a plurality of optical sensor(s) disposed at a selected location on a transport path of a photosensitive material and (each) including a light emitter and a light receiver for optically detecting the photosensitive material. This apparatus includes a pulse generator provided for a drive motor associated with the transport path. The pulse generator generates a pulse signal synchronized with rotation of the drive motor. The light emitters emit pulsed light whose intervals between ON periods are controlled on the basis of the pulse signal, such that the pulsed light has short intervals when the photosensitive material is transported at high speed and long intervals when the photosensitive material is transported at low speed.

13 Claims, 5 Drawing Sheets

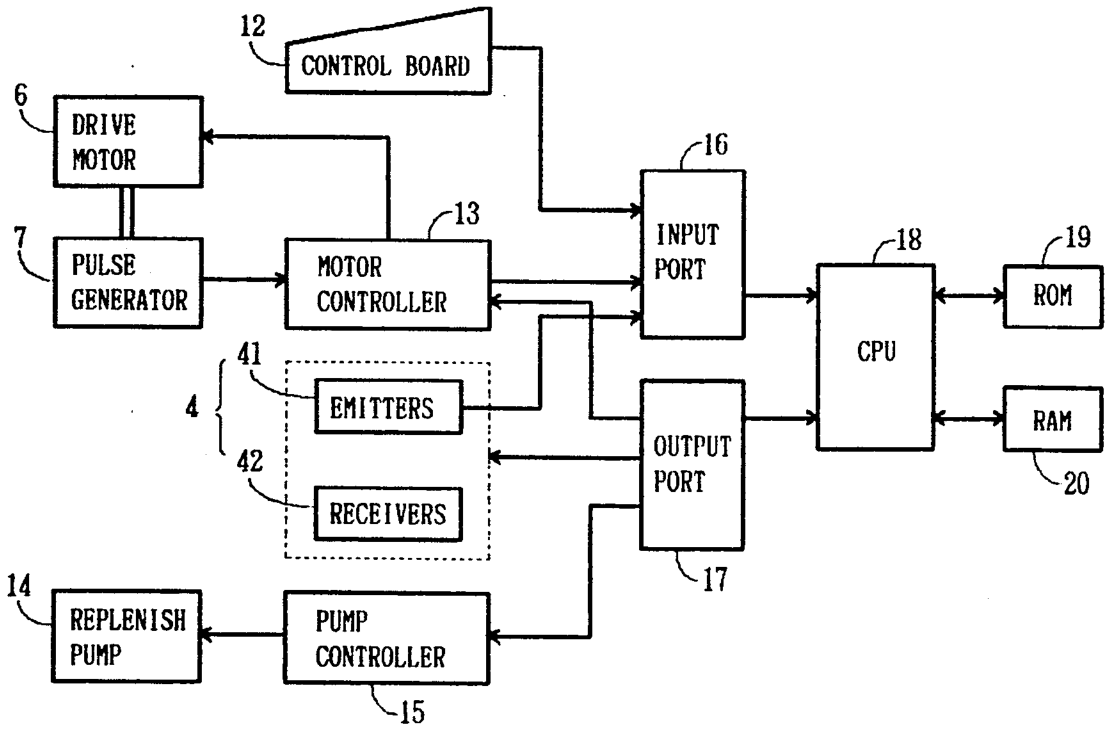
Fig. 3
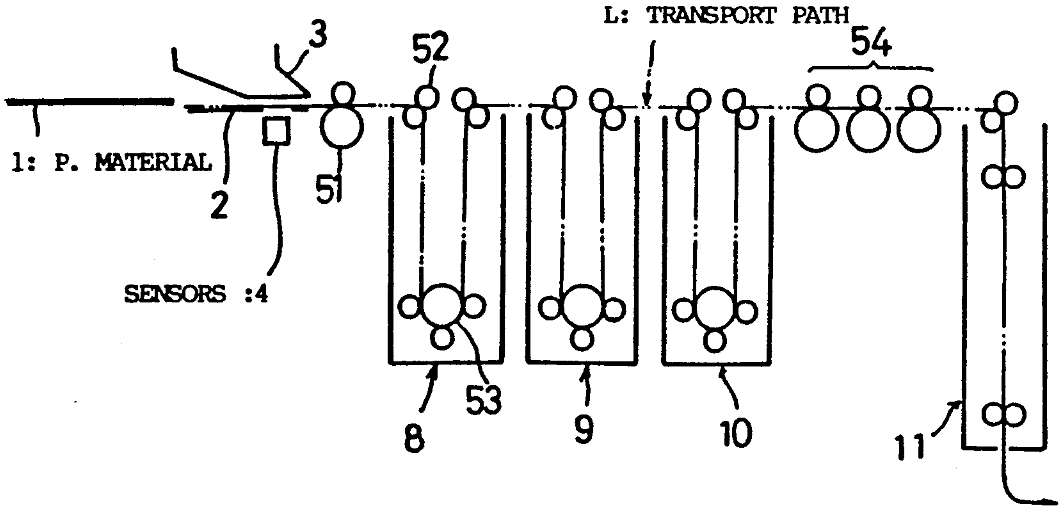

PHOTOSENSITIVE MATERIAL DETECTING APPARATUS

BACKGROUND OF THE INVENTION

1. Field of the Invention

The present invention relates to an apparatus for optically detecting photosensitive material (such as photographic film for prepress use) which is transported through an automatic processor, automatic developing machine or the like.

2. Description of the Related Art

Conventionally, an automatic processor has optical sensors disposed at a suitable location (such as at a photosensitive material inlet) for detecting photosensitive material. Signals from such sensors are used for the following controls:

(1) To change the photosensitive material transport mechanism from a relatively slow standby state to a selected processing speed, (2) To increase drying temperature from a low standby temperature to a selected temperature, (3) To start supplying wash water, and (4) To measure the length of the photosensitive material by detecting the leading and trailing ends thereof, to derive the area of the photosensitive material from its length, and to replenish the machine with processing solutions on the basis of the area of the photosensitive material.

When optically detecting photosensitive material, it is necessary to prevent fogging of the photosensitive material due to the light emitted by the optical sensors. Examples of countermeasures against such fogging are disclosed in Japanese patent applications laid open under Nos. 1988-12986 and 1988-157087.

Such detecting apparatus prevent fogging of the photosensitive material by employing optical sensors that emit pulsed light so that cumulative exposure of the photosensitive material is maintained below a critical exposure level, which is determined by the sensitivity of the material. However, the pulse width of light emitted from such optical sensors is selected without regard to the photosensitive material transport speed. This gives rise to the following problem:

Generally, in an automatic processor, the photosensitive material transport speed may be changed for different types of photosensitive material. Therefore, the optical sensors emit pulsed light with a pulse width which is long enough to avoid fogging even when the photosensitive material is transported at a minimum speed.

However, this long pulse width cannot be used to precisely detect photosensitive material transported at a high speed. This is because the photosensitive material will advance a considerable distance from a point of time the photosensitive material reaches a position opposed to the optical sensors to a point of time the photosensitive material is detected by the pulsed light. Normally, the automatic processor has a maximum transport speed which is 3 to 6 times the minimum transport speed, and hence a large detecting error will occur at the maximum transport speed. This could lead to a serious situation, including improper developing, particularly when processing solutions are replenished on the basis of the measured area of the photosensitive material.

SUMMARY OF THE INVENTION

The present invention represents an improvement upon the state of the art noted above, and its object is to provide a system which is capable of detecting photosensitive material with high precision regardless of transport speed, while avoiding fogging of the photosensitive material.

Thus, the present invention relates to a system in which pulsed light is used to detect photosensitive material, and in which signals are generated in synchronization with the transporting of the material along a transport path, and the emission of the pulsed light is controlled in response to the signals. According to the present invention, the pulsed light is emitted in relatively long cycles when the photosensitive material is transported at a low speed and in correspondingly shorter cycles when the photosensitive material is transported at a higher speed.

Other objects and features of the present invention will become apparent from the detailed description to follow.

BRIEF DESCRIPTION OF THE DRAWINGS

For the purpose of illustrating the invention there are shown in the drawings several forms which are presently preferred, it being understood, however, that the invention is not limited to the precise arrangements and instrumentalities shown.

FIG. 1 is a block diagram of a control system for an automatic processor;

FIG. 3 is a schematic view of the automatic processor;

DETAILED DESCRIPTION OF THE PREFERRED EMBODIMENTS

Figure 2:
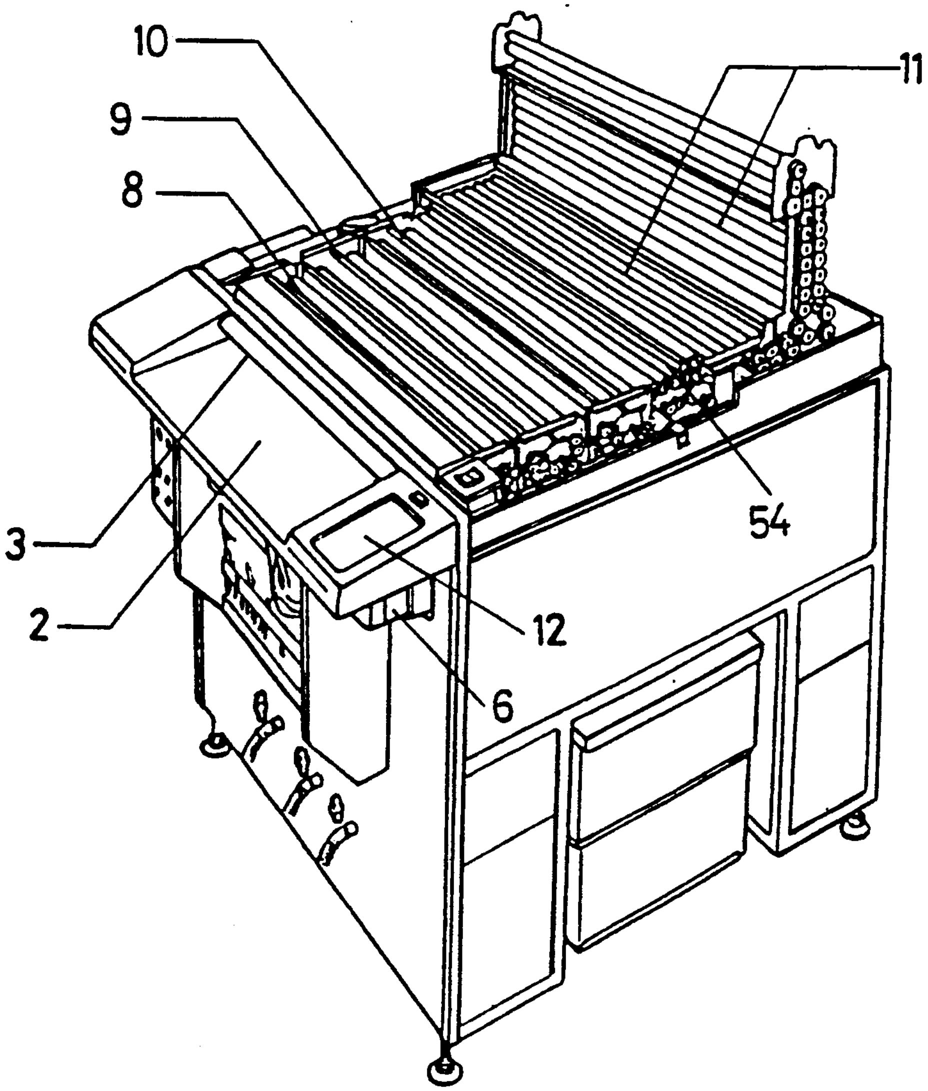
FIG. 2 is a perspective view of the automatic processor shown with a top cover removed.

Referring to FIGS. 2 and 3, photosensitive material 1 is inserted through a space between a feed tray 2 and an insert guide 3 which are disposed at an inlet of an automatic processor. A plurality of optical sensors 4 for detecting the photosensitive material 1 are located at an exit region of the feed tray 2.

Figure 4:
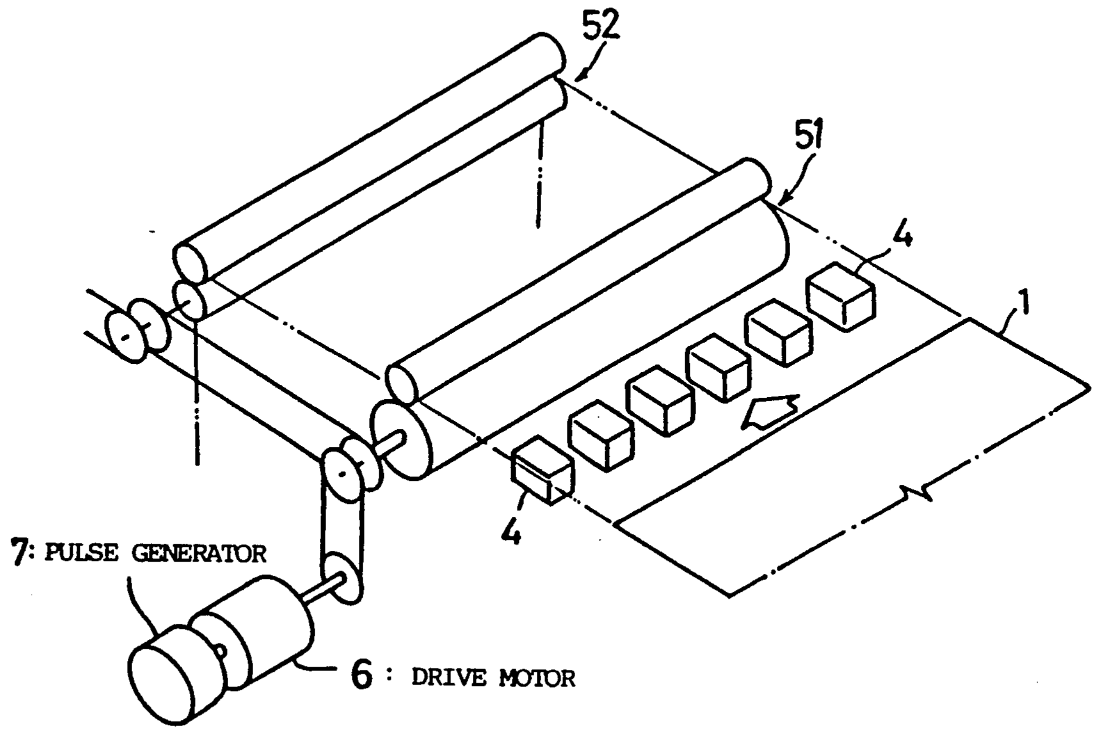
FIG. 4 is a perspective view of a part of the processor for detecting photosensitive material.
Figure 5:
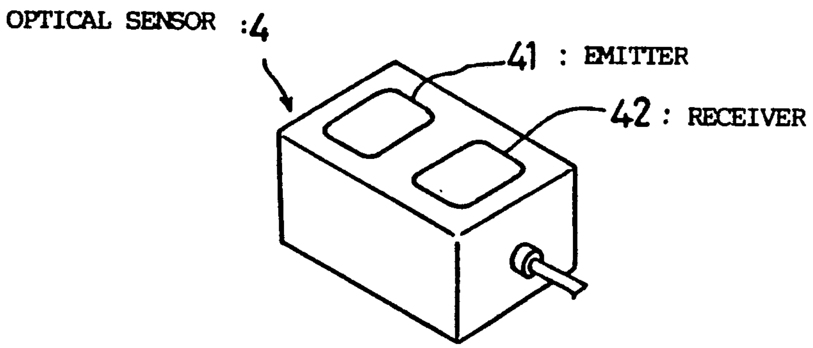
FIG. 5 is a perspective view of an optical

As shown in FIG. 4, the optical sensors 4 are arranged in a direction which is perpendicular to the direction in which the photosensitive material 1 is inserted. The sensors 4 detect the leading end, trailing end and width of the photosensitive material 1. As shown in FIG. 5, each of the sensors 4 is a reflection type optical sensor, with a light emitter 41 and a light receiver 42.

Upon detection of the leading end of the photosensitive material 1, transport rollers 5 (51, 52, 53, . . . ) are switched from a low speed standby state to a predetermined rotating speed. As shown in FIG. 4, the transport rollers 5 are interconnected by a belt mechanism (or the like) so as to be driven by a single drive motor 6. The drive motor 6 has a pulse generator 7 for generating a pulse signal which is synchronized with the rotation of the motor 6.

After the leading end of the photosensitive material 1 reaches the feed rollers 51, the photosensitive material 1 advances along a transport path L (shown in phantom in FIG. 3). The photosensitive material 1 is transported along the transport path L by the rollers 52 and 53 to a developer tank, a fix tank 9, and a wash tank 10, in succession. The photosensitive material 1, having been washed, is transported through squeeze rollers 54 to a dryer tank 11.

FIG. 1 is a block diagram of a system for controlling the automatic processor. The control system includes a control board 12 for inputting transport speed and other processing conditions, a motor controller 13 for controlling the drive motor 6, the optical sensors 4, and a pump controller 15 for controlling a replenish pump 14 (which replenishes the processor with processing solutions). All of these components are connected to a CPU 18 though an input port 16 or an output port 17.

The CPU 18 provides a signal to control the pulse width of light emitted by the light emitters 41 (in this embodiment). Various other functions of the CPU 18 will be explained later.

Reference 19 denotes a ROM for storing a processing program for operating the CPU 18. Reference 20 denotes a RAM for storing input data.

Figure 7:
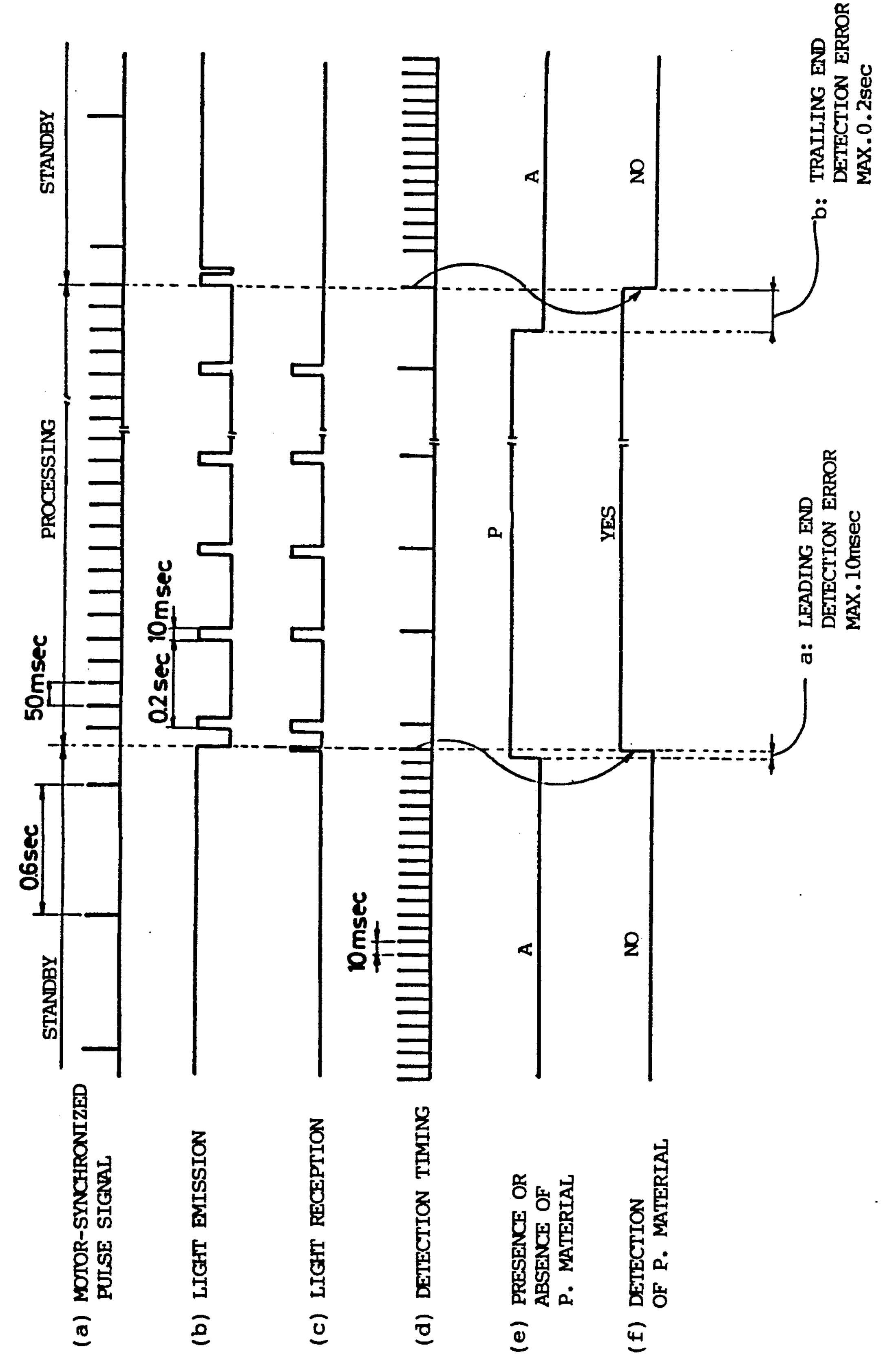
FIG. 7 is a time chart for the photosensitive material detecting operation.

In FIG. 7, (a) represents the pulse signal outputted from the pulse generator 7, (b) represents the emission output from the light emitters 41, (c) represents the reception output from the light receivers 42, (d) represents the detection timing of the optical sensors 4, (e) represents whether the photosensitive material 1 is actually present in the automatic processor or not, and (f) represents whether the photosensitive material 1 is detected or not.

Figure 6:
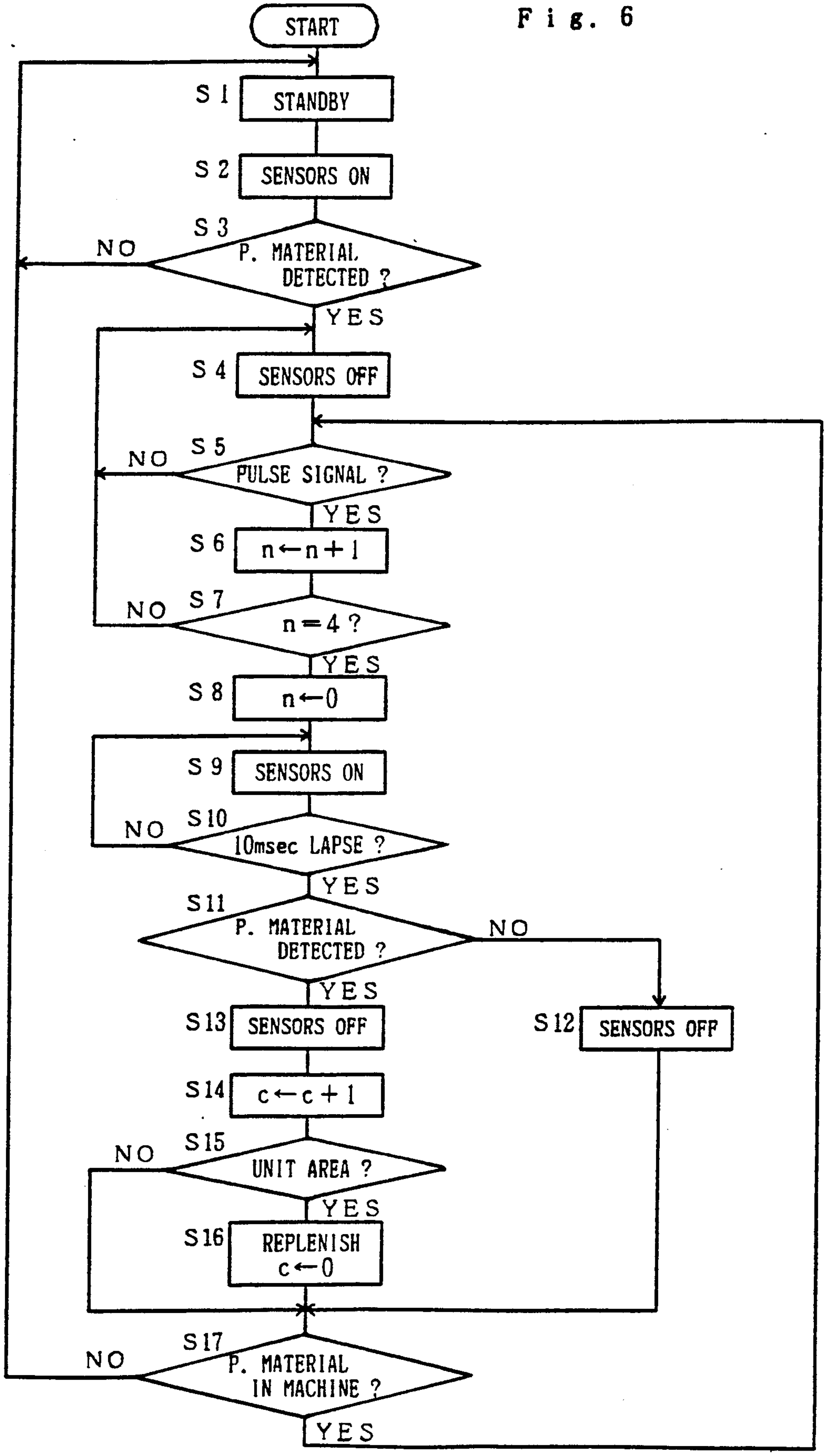
FIG. 6 is a flowchart of a method of detecting the photosensitive material.

Referring to FIG. 6, steps S1 through S3 show a standby state in which the photosensitive material 1 is not detected by the optical sensors 4. In the standby state, the transport rollers 5 are driven at a low speed. Components of processing solutions in the developer tank 8 and fix tank 9 would be deposited on surfaces of the transport rollers 5 if the rollers 5 were stationary. In this embodiment, the rotating speed of the transport rollers 5 in the standby state is 2.5 mm/sec. In this state, the pulse generator 7 outputs a pulse signal for every 1.5 mm of transport distance (that is, every 0.6 sec). The light emitters 41 are all continuously lit during the standby state, as noted above, with the light receiving states of the light receivers 42 being checked every 10 msec.

Steps S4 through S17 occur after the detection of the material 1 by the optical sensors 4. Specifically, when the sensors 4 detect the leading end of the photosensitive material 1, the continuous lighting of the light emitters 41 is stopped. Then, the CPU 18 outputs a command to the motor controller 13 to establish a predetermined processing speed. In this embodiment, the processing speed is 30 mm/sec. Once the transport rollers 5 are driven at the processing speed, the pulse generator 7 outputs the pulse signal every 50 msec, in synchronism therewith.

After the processing operation is started, the light emitters 41 are driven by pulses for detection of the photosensitive material 1. The ON periods of the pulsed light are suitably determined by taking into account the relationship between the possibility of fogging the photosensitive material 1 and the sensitivity characteristics of the light receivers 42. Pulsed light lit for short periods will have a reduced tendency to fog the photosensitive material 1. However, the ON periods cannot be shorter than a certain limit because excessively short ON periods will impair detection of the pulsed light by the light receivers 42. In this embodiment, each ON period is 10 msec.

The intervals between the ON periods are suitably determined by taking the possibility of fogging the photosensitive material 1 into account. The shorter the intervals, the more precise the detection of the photosensitive material 1. However, excessively short intervals will result in an increase in unit area exposure of the photosensitive material 1 to the extent of fogging the photosensitive material 1. In this embodiment, the pulsed light is emitted upon the input of every fourth pulse from the pulse generator 7, or at intervals of 0.2 sec, so that fogging is avoided even at the slowest processing or transport speed.

During steps S13 through S16, every time the photosensitive material 1 is detected, count C is incremented. The width of the photosensitive material 1 is known from ON/OFF states of the plurality of optical sensors 4 (which are arranged in a direction which is perpendicular to the direction in which the photosensitive material 1 advances), while the transport speed is already known. Therefore, the area of the photosensitive material 1 having been processed is derived from the count C. When count C reaches a predetermined unit area for replenishing the processing solutions (e.g., 480 square inches in the case of a 24×20 inch photosensitive material), the CPU 18 outputs a processing solution replenish command to the pump controller 15, and resets count C. The program then returns to step S5 to wait for input of a next pulse signal. If all of the photosensitive material 1 is discharged from the processor, the program returns to the standby state (steps S1 through S3).

The photosensitive material 1 in the machine may be detected as described in Japanese patent application laid open under No. 1983-2841, for example. In particular, the automatic processor may include a film detecting device disposed at the inlet thereof. After detecting a film at the inlet, pulses synchronized with the film transport speed are counted to determine the location of the film in the processor, or whether the film is in the processor or not.

As shown in FIGS. 7 (*e*) and (*f*), a leading end detection error "a" is dependent on the detection timing of the optical sensors 4 in the standby state, which is 10 msec (at maximum) in the preferred embodiment. On the other hand, a trailing end detection error "b" is dependent on the detection timing of the optical sensors 4 in the processing state, which is 0.2 sec (at maximum) in the preferred embodiment. Accordingly, an error in terms of time in detecting the photosensitive material 1 is "a-b", which is 0.2 sec (at maximum).

The intervals in the pulsed light during the processing operation are variable in synchronism with the transport speed of the photosensitive material 1. Thus, the error in detecting the length of the photosensitive material 1 is substantially constant regardless of the transport speed.

In the foregoing embodiment, the light emitters 41 are continuously lit while the apparatus is in the standby state, and the detection timing of the light receivers 42 is in an intermittent mode. However, the light emitters 41 may be pulse-driven in synchronism with the detection timing of the light receivers 42. The latter has the advantage of reducing the load on the light emitters 41.

Alternatively, the light emitters 41 may be driven by the pulse signal from the pulse generator 7. However, the intervals in the pulsed light from the optical sensors 4 in the standby state are long since the transport speed in the standby state is slow. Not only would the detection error become greater than in the preferred embodiment, but a time lag of 0.6 sec (at maximum) could occur between insertion of the photosensitive material 1 and establishment of a processing speed.

Further, separate optical sensors may be provided for detecting the width of the photosensitive material 1 and for detecting the opposite longitudinal ends thereof. The longitudinal ends of the photosensitive material 1 may be detected by a single optical sensor employed for that sole purpose if the width data for the material 1 is inputted by other means.

The light emitters 41 are often in an oscillating state while being continuously lit, in which their ON/OFF switching is repeated in extremely short cycles. The term "continuous lighting" as used in the foregoing description includes this oscillating state.

The present invention may be embodied in other specific forms without departing from the spirit or essential attributes thereof and, accordingly, reference should be made to the appended claims, rather than to the foregoing specification, as indicating the scope of the invention.

What is claimed is:

1. An apparatus for detecting photosensitive material, comprising:

detecting means for optically detecting photosensitive material, the detecting means including light emitting means for emitting pulses light and light receiving means for receiving the pulsed light; and means for controlling the light emitting means as a function of the operation of a means for transporting the photosensitive material.

2. An apparatus for detecting photosensitive material, comprising:

detecting means for optically detecting photosensitive material, the detecting means including:

(1) light emitting means for emitting pulsed light, whereby light is emitted during ON periods, with intervals between the ON periods; and (2) light receiving means for receiving the pulsed light;

pulse generating means for generating pulse signals which are synchronized with the operation of a means for transporting the photosensitive material along a transport path; and control means for controlling the intervals between the ON periods in response to the pulse signals.

3. The apparatus of claim 2, wherein the detecting means includes a reflection type optical sensor.

4. The apparatus of claim 2, wherein the control means includes a CPU.

5. An apparatus for handling photosensitive material, comprising:

(A) transporting means for transporting photosensitive material along a transport path;

(B) detecting means for emitting pulsed light and for using the pulsed light to detect the presence of the photosensitive material;

(C) pulse generating means for generating pulse signals which are synchronized with the operation of the transporting means; and (D) control means for controlling the emitting of the pulsed light in response to the pulse signals.

6. The apparatus of claim 5, wherein the detecting means is located at an inlet to the transport path.

7. The apparatus of claim 6, wherein the detecting means includes a plurality of reflection type optical sensors.

8. The apparatus of claim 7, wherein the sensors are arranged in a direction which is perpendicular to the transport path.

9. The apparatus of claim 5, wherein the transporting means includes a rotatable drive motor, the pulse generating means being synchronized with the rotation of the drive motor.

10. The apparatus of claim 5, further comprising:

means for counting emissions of the pulsed light and for thereby deriving the area of the photosensitive material; and means for outputting a processing solution replenish command when a predetermined area of photosensitive material has been processed.

11. A method of handling photosensitive material, comprising the steps of:

(A) transporting photosensitive material along a transport path;

(B) emitting pulsed light and using the pulsed light to detect the presence of the photosensitive material;

(C) generating pulse signals which are synchronized with the transporting of the photosensitive material; and (D) controlling the emitting of the pulsed light in response to the pulse signals.

12. The method of claim 11, further comprising the steps of:

detecting the absence of the photosensitive material; and in response to the detecting of the absence of the photosensitive material, discontinuing the controlling of the emitting of the pulsed light in response to the pulse signals.

13. The apparatus of claim 2 wherein said control means comprises means adapted for controlling said light emitting means in response to the pulse signals received from said pulse generating means when the photosensitive material is detected, and for controlling said light emitting means so as to continuously emit light or emit the pulsed light in fixed cycles when the photosensitive material is not detected.

* * * * *